United States Patent [19]

Mehta

[11] Patent Number: 4,549,810

[45] Date of Patent: Oct. 29, 1985

[54] PHASE SEPARATING ROTARY PROCESSOR AND METHOD

[75] Inventor: Pradip S. Mehta, Corpus Christi, Tex.

[73] Assignee: USM Corporation, Farmington, Conn.

[21] Appl. No.: 685,057

[22] Filed: Dec. 20, 1984

[51] Int. Cl.⁴ ............................................... B01F 7/10
[52] U.S. Cl. ...................................... 366/75; 366/76; 366/77; 366/99; 366/191; 366/307
[58] Field of Search ..................... 159/2 E; 210/360.1, 210/378, 799; 264/176 C, 349; 366/75, 76, 77, 96, 97, 98, 99, 136, 137, 184, 191, 194, 195, 196, 262, 263, 264, 265, 279, 302, 303, 304, 305, 307, 315, 348, 349; 425/203, 206, 207, 224, 376 B

[56] References Cited

U.S. PATENT DOCUMENTS

| | | |
|---|---|---|
| 3,082,816 | 3/1963 | Skidmore . |
| 3,267,075 | 8/1966 | Schnell . |
| 3,799,234 | 3/1974 | Skidmore ............................. 159/2 E |
| 3,963,558 | 6/1976 | Skidmore ............................. 159/2 E |
| 4,142,805 | 3/1979 | Tadmor ................................. 366/97 |
| 4,194,841 | 3/1980 | Tadmor ................................. 366/75 |
| 4,207,004 | 6/1980 | Hold ..................................... 366/97 |
| 4,213,709 | 7/1980 | Valsamis .............................. 366/76 |
| 4,227,816 | 10/1980 | Hold ..................................... 366/99 |
| 4,255,059 | 3/1981 | Hold ..................................... 366/97 |
| 4,289,319 | 9/1981 | Hold ..................................... 366/97 |
| 4,300,842 | 11/1981 | Hold ..................................... 366/99 |
| 4,329,065 | 5/1982 | Hold ..................................... 366/97 |
| 4,389,119 | 6/1983 | Valsamis .............................. 366/99 |
| 4,402,616 | 9/1983 | Valsamis .............................. 366/99 |
| 4,411,532 | 10/1983 | Valsamis .............................. 366/99 |
| 4,413,913 | 11/1983 | Hold ..................................... 366/75 |
| 4,421,412 | 12/1983 | Hold ..................................... 366/76 |
| 4,448,537 | 5/1984 | Sugimori .............................. 366/75 |
| 4,480,923 | 11/1984 | Mehta ................................... 366/99 |
| 4,486,099 | 12/1985 | Tadmor ................................. 366/99 |

FOREIGN PATENT DOCUMENTS 1144184  3/1969  United Kingdom .

Primary Examiner—Philip R. Coe
Assistant Examiner—Arthur D. Dahlberg
Attorney, Agent, or Firm—Frances P. Craig

[57] ABSTRACT

Apparatus and methods for physically separating a heterogeneous mixture of immiscible liquids utilizing the difference in the viscosities of the components. At least one moveable surface is enclosed by at least one stationary surface to form a processing passage. Viscous-drag-induced momentum is transferred preferentially from the moving surface(s) to the more viscous component of the mixture, moving it downstream toward a collecting and pressurizing obstructing member. The resulting pressure "squeezes" the less viscous droplets upstream to separate from the collected material and drain from the passage through a drainage opening.

In a preferred embodiment, an annular channel rotates within a housing, dragging the mixture from an inlet to an obstructing member extending into the passage near an outlet. The separated less viscous component drains from a drainage opening in the housing, while the more viscous component is discharged through the outlet. In another preferred embodiment, a plurality of annular passages is interconnected for series operation by material transfer grooves formed in the closure surface of the housing.

27 Claims, 14 Drawing Figures

PHASE SEPARATING ROTARY PROCESSOR AND METHOD

THE FIELD OF THE INVENTION

This invention relates to novel, improved methods and apparatus for processing viscous materials and particularly for physically separating the phases of a heterogeneous mixture of liquids.

DESCRIPTION OF THE PRIOR ART

Means to separate mixtures of immiscible liquids are known to the art. For example, settling, decanting and centrifuging are all well known methods designed to separate liquids by taking advantage of the differences in density of the liquids. However, for very viscous mixtures or for liquids whose densities are relatively close to one another, separation can be slow and difficult, resulting in unacceptably low separation efficiencies. Various methods such as distillation, rectification, stripping, extraction and devolatilization may all be used to separate liquids utilizing the differences in the vapor pressures of the liquids. These methods, however, can require large energy inputs and/or bulky equipment and may not be appropriate for many temperature-sensitive materials.

Rotary processors are also known to the art. Details relating to such processors are described in U.S. Pat. Nos. 4,142,805; 4,194,841; 4,207,004; 4,213,709; 4,227,816; 4,255,059; 4,289,319; 4,300,842; 4,329,065; 4,389,119, 4,402,616; 4,411,532; 4,413,913; 4,421,412 and in commonly assigned, copending U.S. patent application Ser. Nos. 532,156; 532,157; 532,162; 532,165 and 532,166, all filed Sep. 14, 1983.

Essential elements of the basic individual processing passage of rotary processors disclosed in the above Patents and Applications comprise a rotatable element carrying at least one processing channel and a stationary element providing a coaxial closure surface forming with the channel an enclosed processing passage. The stationary element provides a feed inlet and a discharge outlet for the passage. A stationary blocking member near the outlet provides an end wall surface to block movement of material fed to the passage and to coact with the moving channel walls to establish relative movement between the blocked material and the moving channel walls. This coaction permits material in contact with the moving walls to be dragged forward to the end wall surface for collection and/or controlled processing and/or discharge.

As disclosed in the above Patents and Applications, the processing passages present a highly versatile processing capability. The passages are adaptable for performing such processing operations as melting, mixing, pressurizing, pumping, devolatilizing and homogenizing, among others, as well as adding ingredients to or withdrawing ingredients from materials processed in the passage.

U.S. Pat. Nos. 4,227,816; 4,213,709; 4,389,119; 4,402,616 and 4,411,532 relate to multi-stage rotary processors which include a plurality of processing stages, each having one or more processing passages. Material transfer passages or grooves are formed in the closure surface of the stationary element and arranged to transfer material from a passage (or passages) of one stage to a passage (or passages) of the same or another stage. These multi-stage processors may be arranged to combine in series two or more processing steps, such as melting, mixing and pumping or other combinations of processing steps.

U.S. Pat. Nos. 4,255,059; 4,329,065 and 4,413,913 relate to apparatus and methods for devolatilizing viscous materials by spreading the material as thin films on the sides of the rotating channel walls so that volatile materials can be withdrawn from the surfaces of the thin films. Application Ser. Nos. 532,162 and 532,166 disclose apparatus and methods for foam devolatilizing involving feeding the material to the processing passage, inducing foaming by formation of bubbles of volatiles and non-pressurizing shearing to release the volatiles for removal from the passage. Application Ser. No. 532,156 discloses a vacuum system for use with either film or foam devolatilizers. Application Ser. Nos. 532,157 and 532,165 disclose sealing means to control leakage of pressure and material between processing passages at different pressure levels. These devolatilizers are intended for removal of volatile components from viscous materials, and depend on differences in the vapor pressures of the components. However, separation of components by devolatilizing require large inputs of energy and may be inappropriate for some heat-sensitive materials or close boiling mixtures. It would be advantageous to find an energy efficient means to physically separate the phases that does not rely on differences in density or vapor pressure.

British Pat. No. 1,144,184 describes and claims a device for making briquettes from raw cement slurry. A hollow drum, perforated on its periphery and carrying radial flanges defining annular channels, rotates within a casing to carry the slurry from an inlet to an extrusion die. A scraper removes slurry from the drum and directs it toward the die. The continuous rotation of the drum builds up pressure upstream of the extrusion die, compacting the solids and forcing the slurry water out through the perforated drum. In a preferred embodiment, water removal is aided by evacuation of the drum interior. The compacted solids are extruded through the die as briquettes. This apparatus however, is specifically designed to process crude liquid-solid mixtures and to effect minimal separation — that is to remove only enough water to permit the formation of briquettes from the compacted solids.

U.S. Pat. No. 4,448,537 discloses a screw extruder having a hydro-extracting section formed with doughnut shaped plates and having slits between adjacent plates. Raw material comprising resin in particulate, solid form mixed with relatively large quantities of liquid, such as are formed by polymerization in an aqueous system, are fed to the hydro-extracting section for removal of most of the liquid from the solid resin before melting conventionally in a downstream section of the extruder. Any remaining liquid must be removed by heating and venting in a devolatilization step. In the hydro-extracting section, the action of the rotating screw compacts the resin particles and forces the water out through the slits between the plates. The compacted, partially dried solids are then carried downstream to the melting section of the extruder. Neither the British Patent nor the '537 Patent disclose apparatus or methods for separating heterogeneous mixtures of immiscible liquids of different viscosities.

This invention presents to the art novel energy efficient apparatus and methods for separating such mixtures utilizing the differences in the viscosities of the phases of the mixture, and is especially advantageous for physically separating highly Viscous, close-boiling or temperature sensitive immiscible liquid materials or those having similar densities.

BRIEF SUMMARY OF THE INVENTION

The novel apparatus and methods of this invention involve physically separating out at least one phase of a heterogeneous mixture of immiscible liquids utilizing the differences in the viscosities of the components. A processing chamber or passage is formed by at least one stationary surface, at least one surface moveable in a downstream direction relative to the stationary surface, and an obstructing member between the two surfaces. As the moveable surface is moved in a downstream direction relative to the stationary surface and the obstructing member, viscous-drag-induced momentum is transmitted to a recirculating pool of viscous mixture and at least partially blocked and collected in the passage at the obstructing meaber, pressurizing the mixture. Because the momentum transferred depends on the viscosity of the material, this momentum is transmitted preferentially to the more viscous component of the mixture, moving the more viscous component, against the pressure profile, downstream relative to the less viscous component. The droplets or globules of less viscous component are coalesced and "squeezed" upstream toward a region of lower pressure. The droplets or globules of less viscous component separate from the recirculating pool at its upstream boundary and collect in the passage upstream of the pool. They may be drained conventionally from the passage through a drainage opening.

A preferred embodiment of the invention involves a rotary processor in which moveable surfaces are provided by the opposed side walls of one or more annular channels carried by a rotor. A stationary surface is provided by the closure surface of a housing coaxial with the rotor and forming with the channels one or more enclosed processing passages. Inlets, outlets, the drainage openings and the obstructing members, which provide end walls for the passages, are associated with the housing. The passages may be arranged for parallel and/or series operation. As the rotor is rotated within the housing, material introduced to each passage through its inlet is dragged by the rotating channel walls toward the end wall, where it is collected as a recirculating pool. The continued viscous-drag action of the rotating side walls on the material in the pool pressurizes the material and separates the less viscous component from the mixture. The separated, less viscous component is drained from the passage through the drainage opening and the remaining material is discharged through the outlet.

Details relating to the novel apparatus and methods of this invention as well as the advantages derived therefrom will be more fully appreciated from the Detailed Description of the Preferred Embodiments taken in connection with the Drawings.

BRIEF DESCRIPTION OF THE DRAWINGS

FIG. 1b is a graphic representation of the pressurization of material within the processing passage of FIG. 1a;

FIGS. 11 and 12 are graphic representations of the separation efficiencies of processors of the invention.

DETAILED DESCRIPTION OF PREFERRED EMBODIMENTS

Figure 1A:
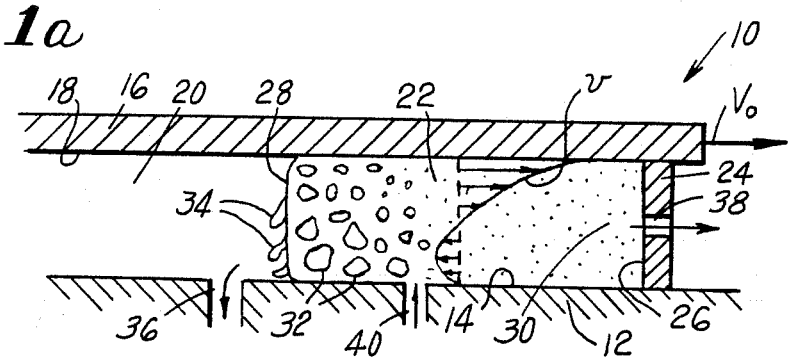
FIG. 1a is a simplified, diagrammatic, cross-sectional representation of one embodiment of the invention illustrating the transfer of momentum from the apparatus to the material.

The novel phase-separating processor of this invention is shown in FIG. 1a as a simplified parallel-plate model. Processor 10 includes stationary element 12 providing at least one stationary surface 14 and moveable element 16 providing at least one moveable surface 18. Surfaces 14 and 18 cooperate to form enclosed processing chamber or passage 20, in which material 22, which is a heterogeneous mixture of immiscible liquids of differing viscosities, may be processed to separate the less viscous phase or component from the mixture. As element 16 is moved relative to element 12 in a downstream direction (by means not shown) at velocity $V_o$ (FIG. 1a), viscous-drag-induced momentum is transmitted in a direction generally perpendicular to $V_o$ from surface 18 through material 22 in the passage, as illustrated by velocity profile v in FIG. 1a. The velocity of the material at any point in the passage is affected by factors including the pressure at that point, the distance from surface 18, the velocity $V_o$ of surface 18 and the viscosity of the material. Because of this dependence of the momentum on the viscosity of the material, momentum is transmitted preferentially to the more viscous phase or component of material 22. This results in movement of more viscous component in the same direction as the movement of surface 18.

Figure 1B:
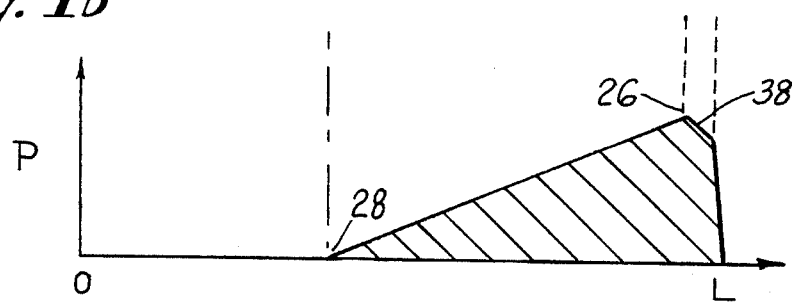

Obstructing member 24 fits closely within passage 20 to provide end wall surface 26 to at least partially block the downstream movement of material 22 through passage 20, collecting the material as a recirculating pool extending upstream from end wall 26 to pool boundary 28. Pressure P (illustrated in FIG. 1b) is induced within material 22 collected at surface 26, increasing along length L from the lowest pressure at upstream boundary 28 of the recirculating pool, to a maximum, normally at end wall 26. As the more viscous component of material 22 continues to be dragged downstream against this preestablished pressure profile toward end wall 26, separation of the more viscous component from the less viscous component occurs, with more viscous component 30 (FIG. 1a) approaching end wall 26 and droplets of less viscous component being "squeezed" upstream relative to more viscous component 30 to a region of lower pressure. As a result of agitation of material 22 within the recirculating pool, the droplets of less viscous component coalesce into larger droplets or globules 32, which move upstream through the passage toward boundary 28 of the pool. At boundary 28, droplets or globules 32 separate from the recirculating pool, forming droplets or globules 34 on the surface of boundary 28 and collecting as a continuous phase in the passage upstream of boundary 28. Drainage opening 36 may be arranged, for example in stationary member 12, to provide conventional, e.g. gravitational, drainage of droplets 34 of the less viscous component from passage 20. In practice, it has been found that with sufficient residence time this separating out of coalesced droplets of the less viscous component will continue to occur until a high degree of separation efficiency is achieved.

For continuous operation of the above-described phase-separating apparatus, outlet 38 may be provided in obstructing member 24 or elsewhere in passage 20 to allow continuous or intermittent discharge of more viscous component 30 from passage 20. Likewise, inlet 40 may be provided through stationary element 12, as shown in FIG. 1a, or elsewhere in passage 20 to allow continuous or intermittent feeding of material to the passage. Material may be introduced directly to the recirculating pool, or may be dragged to the recirculating pool by moving surface 18.

Figure 2:
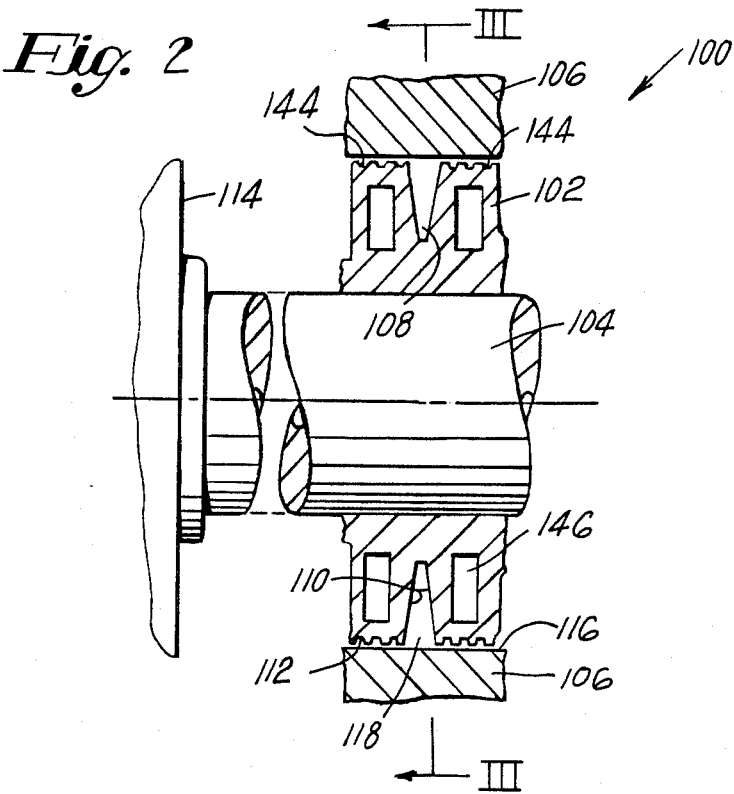
FIG. 2 is a simplified cross-sectional plan view of another embodiment of the invention.
Figure 3:
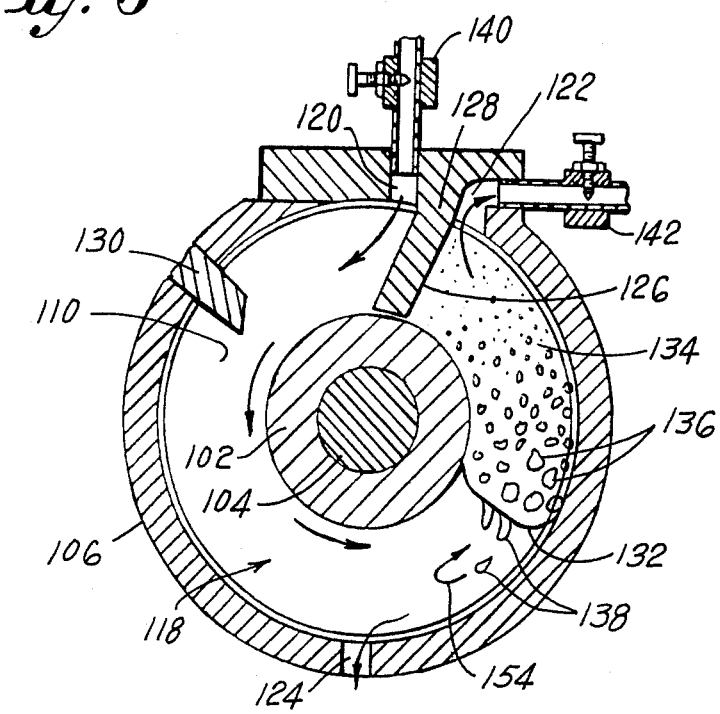
FIG. 3 is a simplified cross-sectional view of the processor of FIG. 2, taken along line 3—3 of FIG. 2.

As described in above-referenced U.S. Pat. Nos. 4,142,805 and 4,194,841, the dragging efficiency of a processor may be increased by providing two opposed, simultaneously moving surfaces in place of the single moving surface 18 of FIG. 1a. Accordingly, a preferred embodiment of the invention which provides two moving surfaces for generating viscous-drag-induced momentum within the material is illustrated in FIGS. 2 and 3 as rotary processor 100, which includes rotor 102 mounted on drive shaft 104 for rotation within a stationary element comprising housing 106. Rotor 102 carries processing channel 108 having opposed side walls 110 extending inwardly from rotor surface 112. Means 114 for rotating rotor 102 may be of any suitable type commonly used for rotating extruders or similar processing apparatus and are well known to those skilled in the art. Housing 106 provides coaxial closure surface 116 cooperatively arranged with surface 112 of rotor 102 to form with channel 108 enclosed processing passage 118. Inlet 120 and outlet 122, as well as drainage opening 124 (FIG. 3), are formed in housing 106. Drainage opening 124 may be arranged for gravitational drainage, as shown in FIG. 3, or for other conventional drainage. Stationary obstructing member 128, which is associated with housing 106, fits closely within channel 108 and provides end wall 126 for passage 118. Flow director 130 may be provided near inlet 120 to direct material entering passage 118 radially inward within the passage.

In operation, material comprising a heterogeneous mixture of immiscible liquids of differing viscosities is supplied gravitationally or by force feeding to the processor through inlet 120 (FIG. 3) and preferably is directed radially inward to the root of passage 118 by flow director 130. The material is dragged forward through passage 118 toward end wall 126 by the viscous-drag-induced momentum transferred to the material by rotating side walls 110 (FIG. 2) of the passage. At end wall 126 (FIG. 3) the material is blocked and collected to form recirculating pool 132, in which pressure is induced within the material by the continuing rotation of side walls 110 past the material in the pool, reaching a maximum at end wall 126. The momentum and pressure induced within the material in recirculating pool 132 results in separation of less viscous component 136 from the material in a manner similar to that taking place in processor 10 illustrated in FIG. 1a. Less viscous component 136 is separated from the material in recirculating pool 132, normally forming continuous phase 138 upstream of recirculating pool 132. The less viscous component is then discharged from passage 118 through drainage opening 124, while the material 134 approaching outlet 122 is discharged from the passage through the outlet.

The feeding of material to the passage may be controlled, such as by providing valve 140 at inlet 120. Likewise, the pressure within the material upstream of outlet 122 and the size of recirculating pool 132 may be controlled, for example by providing valve 142 at outlet 122 (FIG. 3). Preferably, sealing means such as seals 144 (FIG. 2), are provided on rotor surface 112 to prevent leakage of pressurized material from passage 108 through the clearance between rotor surface 112 and closure surface 116. The temperature of the material within passage 108 may be controlled, such as by temperature control means 146 (FIG. 2), which is a series of chambers within rotor 102 and/or elsewhere in the processor through which a heat transfer fluid may be circulated in known manner to provide heating or cooling of the material in passage 108. Details relating to suitable sealing means 144 and suitable heating means 146 can be found in U.S. Pat. Nos. 4,142,805; 4,194,841; 4,207,004; 4,289,319 and 4,300,842, referenced above.

Figure 4:
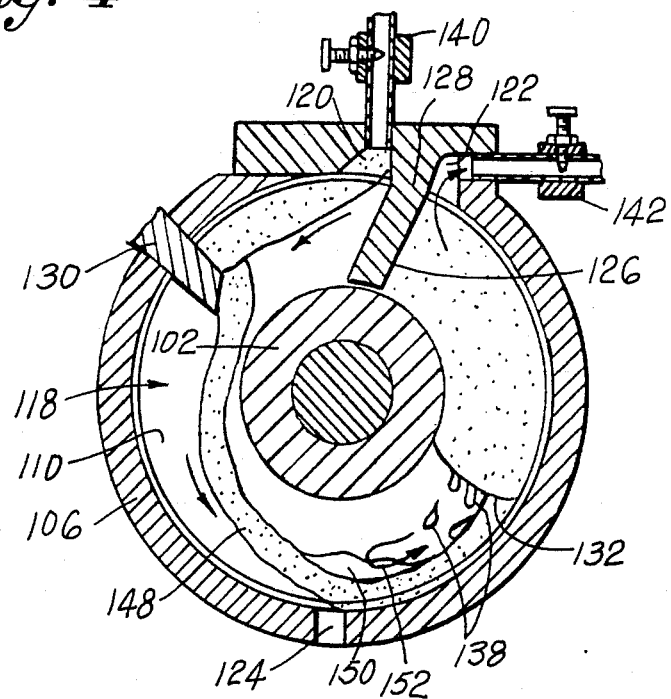
FIG. 4 is is another view of the processor of FIG. 3 under different processing conditions.

For most materials to be separated, and under most processing conditions, rotary processor 100 illustrated in FIGS. 2 and 3 provides efficient separation of the phases of the heterogeneous mixture. However, for certain materials and under certain processing conditions modifications may be necessary to adapt the processor of FIGS. 2 and 3 to increase separation efficiency. For example, for high viscosity materials and/or at higher speeds of rotation, material entering passage 118 (FIG. 3) at inlet 120 and directed by flow director 130 radially inward within the passage, will normally be carried in the form of a rope of material toward recirculating pool 132 by the radially inward portions of side walls 110 of the passage. However, as illustrated in FIG. 4, at lower speeds of rotation and/or when processing lower viscosity materials, rope 148 of material passing flow director 130 may be pulled vertically downward by the force of gravity, approaching recirculating pool 132 in the radially outward region of passage 118. This "sagging" rope 148 of material can block access of less viscous component 138 to drainage opening 124, resulting in collected pool 150 of less viscous component being trapped by rope 148. Some of the less viscous component from pool 150 may be picked up by rope 148 and by rotating side walls 110 of passage 118 and carried back to recirculating pool 132 to be remixed with the more viscous component in the pool, as shown by arrow 152 of FIG. 4, lowering the apparent separation efficiency of the processor. Also, small amounts of more viscous component can enter drainage opening 124, contaminating the drained less-viscous component and/or plugging the drainage opening.

To a lesser degree, the above-described recycling and remixing of less viscous component with the material in recirculating pool 132 may be encountered under processing conditions other than those described with reference to FIG. 4. For example, under certain processing conditions and/or when processing certain materials, it may be desirable to adapt passage 118 to provide a higher degree of pressurization of the material within recirculating pool 132 by narrowing the gap between side walls 110 of passage 118. In a narrow passage, less viscous component 138 separated from recirculating pool 132 may more readily contact and be "recaptured" by rotating side walls 110 to be recycled and remixed with the material in recirculating pool 132, as shown by arrow 154 of FIG. 3, in a manner similar to that described in reference to FIG. 4, resulting in a lowering of the apparent separation efficiency of the processor.

Figure 5:
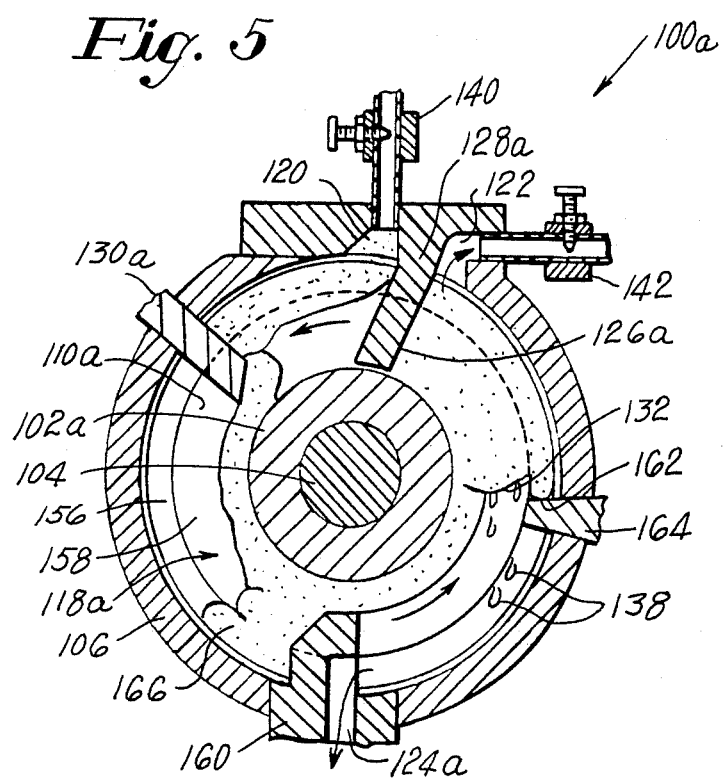
FIG. 5 is a simplified cross-sectional view of a processor similar to that illustrated in FIG. 3, modified to operate efficiently under the processing conditions illustrated in FIG. 4.
Figure 6:
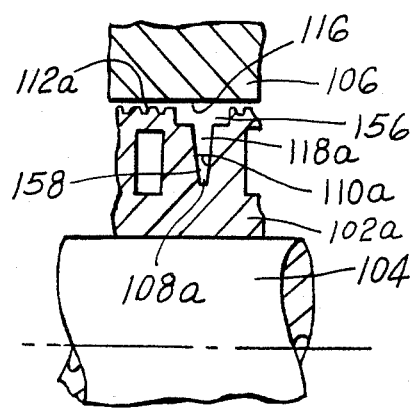
FIG. 6 is a simplified cross-sectional plan view of a portion of the processor of FIG. 5, illustrating in more detail the cross-sectional configuration of the processing channel.
Figure 7:
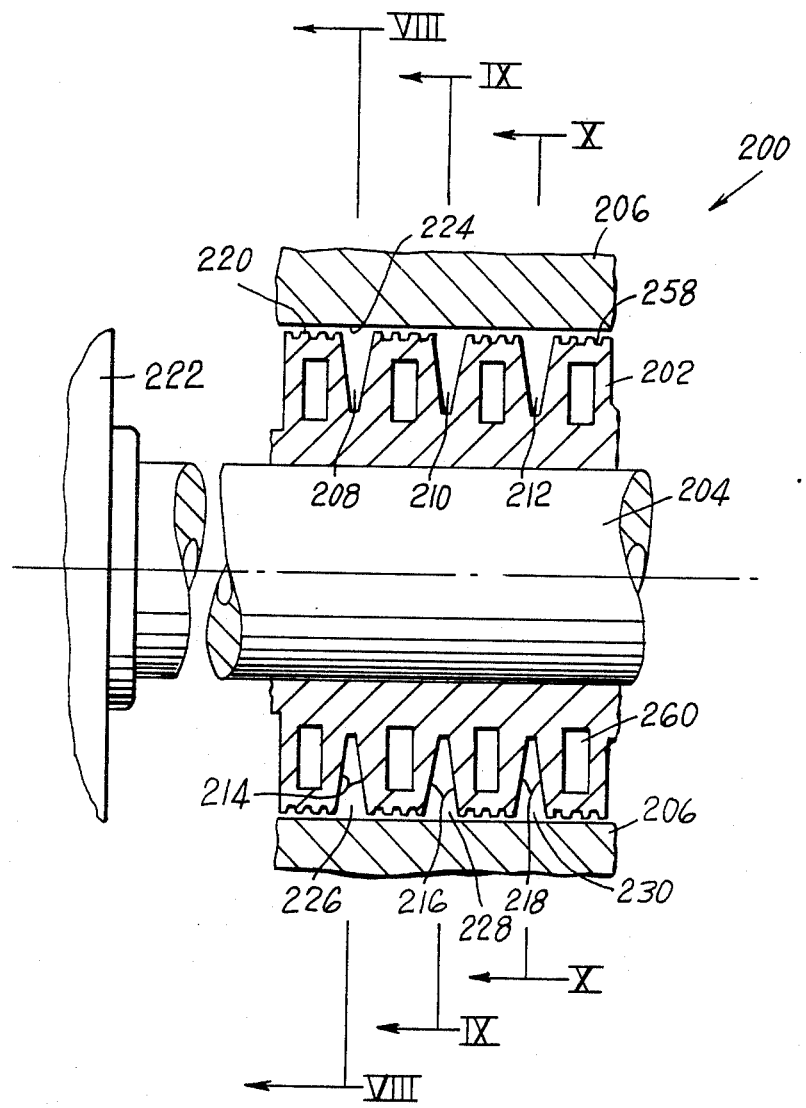
FIG. 7 is a simplified cross-sectional plan view of multi-stage embodiment of the invention.

FIGS. 5 and 6 illustrate an alternate arrangement, designated 100a of a rotary processor similar to processor 100, adapted to provide more efficient separation under the operating conditions described above and to prevent plugging of the drainage opening. As illustrated in FIG. 5, rotor 102a mounted on drive shaft 104 is adapted for rotation within housing 106. Rotor 102a carries processing channel 108a (FIG. 6) having opposed side walls 110a extending inwardly from rotor surface 112a. Coaxial closure surface 116 of housing 106 cooperates with channel 108a to form enclosed processing passage 118a. As illustrated in FIG. 6, processing passage 118a has a T-shaped cross-sectional configuration, in which radially outward portion 156 of passage 118a is significantly wider than radially inward portion 158, facilitating drainage of less viscous component 138 (FIG. 5) released from recirculating pool 132. End wall surface 126a of obstructing member 128a is also T-shaped in cross-section, fitting closely within channel 108a.

Additional flow director 160 may be provided to redirect the material being dragged through passage 118a radially inwardly within the passage to minimize trapping of droplets 138 of lower viscosity material. Flow director 160 is T-shaped in cross-section and may be adapted to provide drainage opening 124a, as illustrated in FIG. 5. Also shown in FIG. 5 is flow director 130a, which is T-shaped in cross-section. Both flow directors preferably extend radially inward into passage 118a to a depth just sufficient to insure contact of the material with the root of passage 118a without causing undue pressurization or material build-up upstream of the drainage opening.

Because of the relationship between melt pool size and pressure at the end wall, as described in detail in above-referenced U.S. Pat. No. 4,421,412, portion 162 of recirculating pool 132 in radially outward portion 156 of passage 118a can extend further upstream than the radially inward portion of melt pool 132, as illustrated in FIG. 5. With some materials and under certain processing conditions, portion 162 of the recirculating pool may extend sufficiently far upstream within portion 156 to interfere with drainage of the less viscous component. Blocking member 164, extending into and fitting closely within portion 156 of passage 118a, may be provided to control the upstream extent of portion 162 of recirculating pool 132.

In operation, material entering passage 118a at inlet 120 (FIG. 5) is redirected radially inwardly by flow director 130a and is dragged by rotating side walls 110a toward flow director 160. At flow director 160, any material "sagging" away from inward portion 158 of passage 118a is collected as pool 166 behind flow director 160 and is redirected toward inward portion 158 of the passage. The degree of pressurization of material in and the size of pool 166 may be controlled by controlling the cross-sectional area available in passage 118a for the material to be carried past flow director 160. From flow director 160, the material is carried by channel 108a toward recirculating pool 132 where separation of the less viscous component from the material is effected, as described above. The upstream extent of portion 162 of recirculating pool 132 is controlled by blocking member 164. Thus, while material to be separated is carried downstream through inward portion 158 of the passage, less viscous component 138 separated from recirculating pool 132 is free to flow upstream through outward portion 156 of the passage to be discharged from the passage through drainage opening 124a, efficiently separating the less viscous component from a heterogeneous mixture of immiscible liquids of differing viscosities.

In processors 100 and 100a described above, end wall 126 or 126a, positioned near the outlet of the passage, obstructs downstream movement of the material, collecting and pressurizing the material to effect separation. Alternatively, a separate, bypassable obstructing element may provide the necessary obstruction, and may be positioned near the outlet or upstream in the passage between the outlet and the drainage opening.

Rotary processor 200, illustrated in FIGS. 7-11 is an especially preferred embodiment of the invention providing a plurality of phase-separating passages. Rotary processor 200 includes rotor 202 mounted on drive shaft 204 for rotation within housing 206. Rotor 202 carries processing channels 208, 210 and 212 (FIG. 7) each having opposed side walls 214, 216 and 218 respectively, extending inwardly from rotor surface 220. Means 222 for rotating rotor 202 may be of any suitable type commonly used for rotating extruders or similar processing apparatus and are well known to those skilled in the art. Housing 206 provides coaxial closure surface 224 cooperatively arranged with surface 220 of rotor 202 to form with channels 208, 210 and 212 enclosed processing passages 226, 228 and 230, respectively. Processing passages 226, 228 and 230 may be arranged for parallel operation providing increased processing rates or may be arranged to provide a plurality of processing stages operating in series, as shown in FIGS. 8-11, providing increased residence time for further separation.

Figure 8:
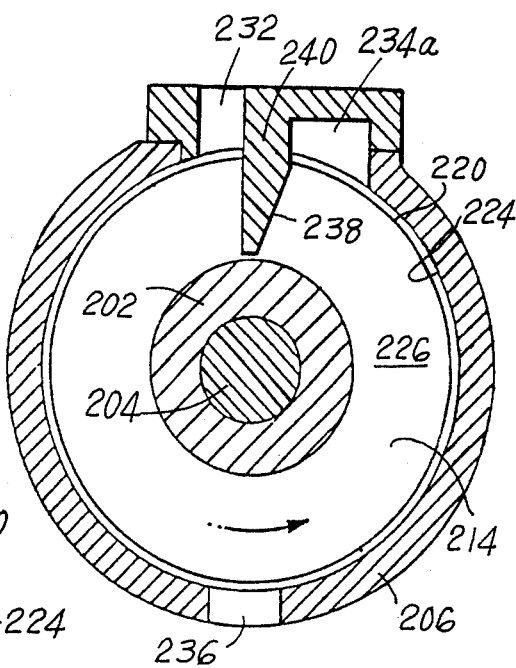
FIG. 8 is a simplified cross-sectional view of the processor of FIG. 7, taken along line 8—8 of FIG. 7.
Figure 9:
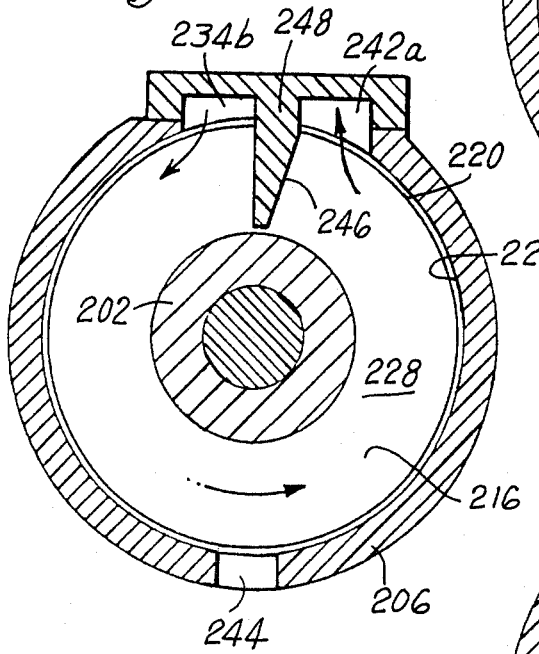
FIG. 9 is a simplified cross-sectional view of the processor of FIG. 7, taken along line 9—9 of FIG. 7.
Figure 10:
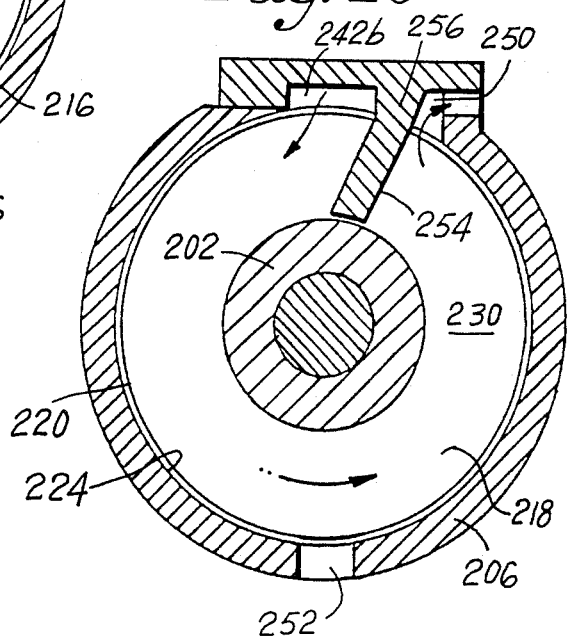
FIG. 10 is a simplified cross-sectional view of the processor of FIG. 7, taken along line 10—10 of FIG. 7.

FIG. 8 illustrates first passage 226 which provides the first processing stage. Passage 226 provides inlet 232 to the processor, outlet 234a and drainage opening 236, each formed in housing 206. Stationary obstructing member 240 provides end wall 238 fitting closely within the passage near outlet 234a. FIG. 9 illustrates second processing passage 228 which provides the second processing stage for the processor. Passage 228 includes inlet 234b, outlet 242a and drainage opening 244, each formed in housing 206. Stationary obstructing member 248 provides end wall 246 fitting closely within the passage near outlet 242a. FIG. 10 illustrates third processing passage 230 which provides the third processing stage for the processor. Passage 230 includes inlet 242b, outlet 250 from the processor and drainage opening 252, each formed in housing 206. Stationary obstructing member 256 provides end wall 254 fitting closely within the passage near outlet 250.

Figure 11:
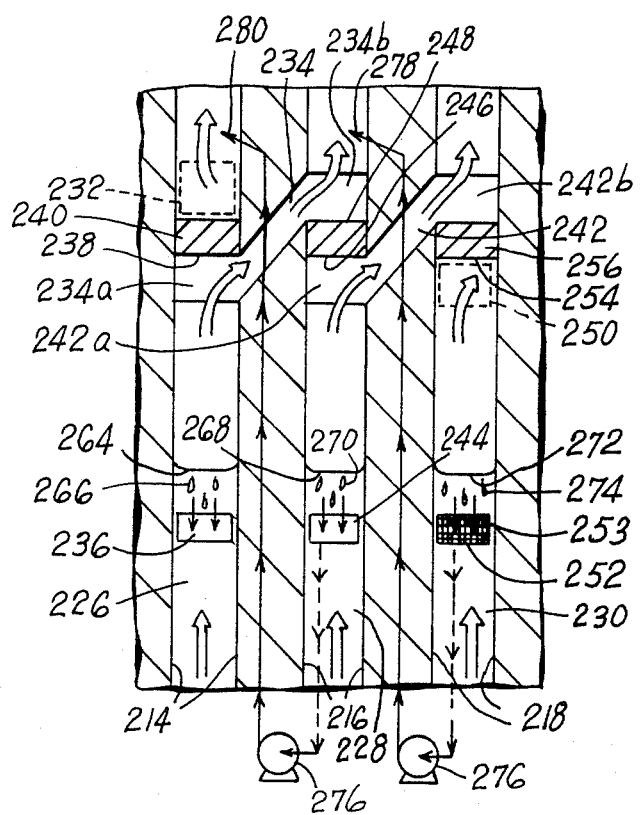
FIG. 11 is a simplified schematic view of the interconnection of the processing passages of the processor of FIG. 7, showing the outline of the transfer passages superimposed on the multi-channel rotor developed into a plane, and with larger arrows indicating the flow direction of material from one processing passage to another through material transfer grooves and smaller arrows indicating counter-current recycling of the less viscous component.

In the preferred embodiment shown in FIG. 11, material transfer grooves 234 and 242 (each formed in housing 206) interconnect the passages of the processor for transfer of the material from one passage to another in series for further processing. Transfer groove 234 provides outlet 234a of passage 226 and inlet 234b of passage 228, while transfer groove 242 provides outlet 242a of passage 228 and inlet 242b of passage 230, interconnecting the passages in series for transfer of the material.

In operation, material is supplied gravitationally or by force feeding to processor 200 through inlet 232 (FIGS. 8 and 11) of passage 226, and is dragged through the passage by rotating side walls 214 toward end wall 238. At end wall 238 the material is collected as recirculating pool 264 (FIG. 11) and is pressurized to separate some of the less viscous component from the material as described above with respect to FIG. 3. Less viscous component 266 is drained from passage 226 through drainage opening 236, while the material remaining in recirculating pool 264 is discharged from passage 226 through outlet 234a and transferred to passage 228 through transfer groove 234 for further processing.

Material, still containing droplets of the less viscous component, enters passage 228 through inlet 234b (FIGS. 9 and 11) and is dragged by side walls 216 of the passage toward end wall 246. At end wall 246 the material is collected as recirculating pool 268 (FIG. 11) and is pressurized to further separate the less viscous component from the material as described above with respect to FIG. 3. Less viscous component 270 is drained from passage 228 through drainage opening 244, while the remaining material in recirculating pool 268 is discharged from passage 228 through outlet 242a and is transferred through material transfer groove 242 to passage 234 for further processing.

Material entering passage 230 (FIGS. 10 and 11) through inlet 242b is dragged by side walls 218 toward end wall 254. The material is collected at end wall 254 as recirculating pool 272 (FIG. 11) and is pressurized to still further separate the less viscous component from the material as described above with respect to FIG. 3. Less viscous component 274 is drained from passage 230 through drainage opening 252. Drainage openings 124, 124a, 236, 244, 252 may be adapted to minimize passage of the more viscous component through the opening, such as by providing screen 253, shown at opening 252 in FIG. 11, or other means to cover the single drainage opening to provide a plurality of closely spaced smaller openings. The remaining material in recirculating pool 272, containing a minimal amount of the less viscous component, is discharged from the processor through outlet 250.

When processing materials for which the probability of separation is affected by the percentage of less viscous component in the material in each stage, the less viscous component drained from each passage may be recycled to another passage of processor 200. An example of this is shown in FIG. 11, in which countercurrent recycling of the less viscous phase is achieved by separately collecting the less viscous component drained from one or more downstream passages (as 230 and 228), pressurizing the collected liquids (as by pumps 276) and reintroducing the pressurized liquids to one or more upstream passages (as at 278 and 280, respectively).

When processing certain materials and/or under certain processing conditions, it may be desirable to modify one or more of the passages of processor 200 in a manner similar to that described above for processor 100 and illustrated in FIGS. 5 and 6 to optimize separation efficiency of the processor. Also, passages 226, 228 and 230 as illustrated in FIGS. 7–11, are shown to be of similar configuration and processing capacity. However, under certain processing conditions and/or for certain materials, it may be desirable to provide passages of differing configurations, such as by changing the size of the gap between the side walls of successive passages as the material moves downstream through the processor to adjust the pressurizing capacity of each successive passage and to optimize the efficiency of separation within successive passages.

Rotary processor 200 as illustrated in FIGS. 7–11 has three processing passages interconnected in series by material transfer grooves. However, other configurations of multi-stage, phase-separating rotary processors are possible. For example, more or fewer passages may be provided, and the passages may be arranged for parallel or series operation, or a combination of parallel and series operation. Also, the passage portions upstream of the pool may be maintained at atmospheric pressure or may be pressurized or evacuated. As may be seen from the above discussion and the following non-limiting examples, the described arrangement of processing elements and conditions can achieve significant separation of the phases of the mixture.

EXAMPLE 1

A rotary processor similar to that described with reference to FIG. 6 was used to separate a heterogeneous mixture of 20% by volume of water in a continuous phase of silicone oil (Viscasil-60,000 manufactured by General Electric Co. and having a viscosity of 60,000 cp). The rotor was 266.7 mm in diameter with a single T-shaped channel 66.7 mm deep and having a width of 25.4 mm in the outer portion and a wedge-shaped inner portion 54.0 mm deep and varying in width from 3.6 mm at the root of the channel to 6.4 mm.

Figure 12:
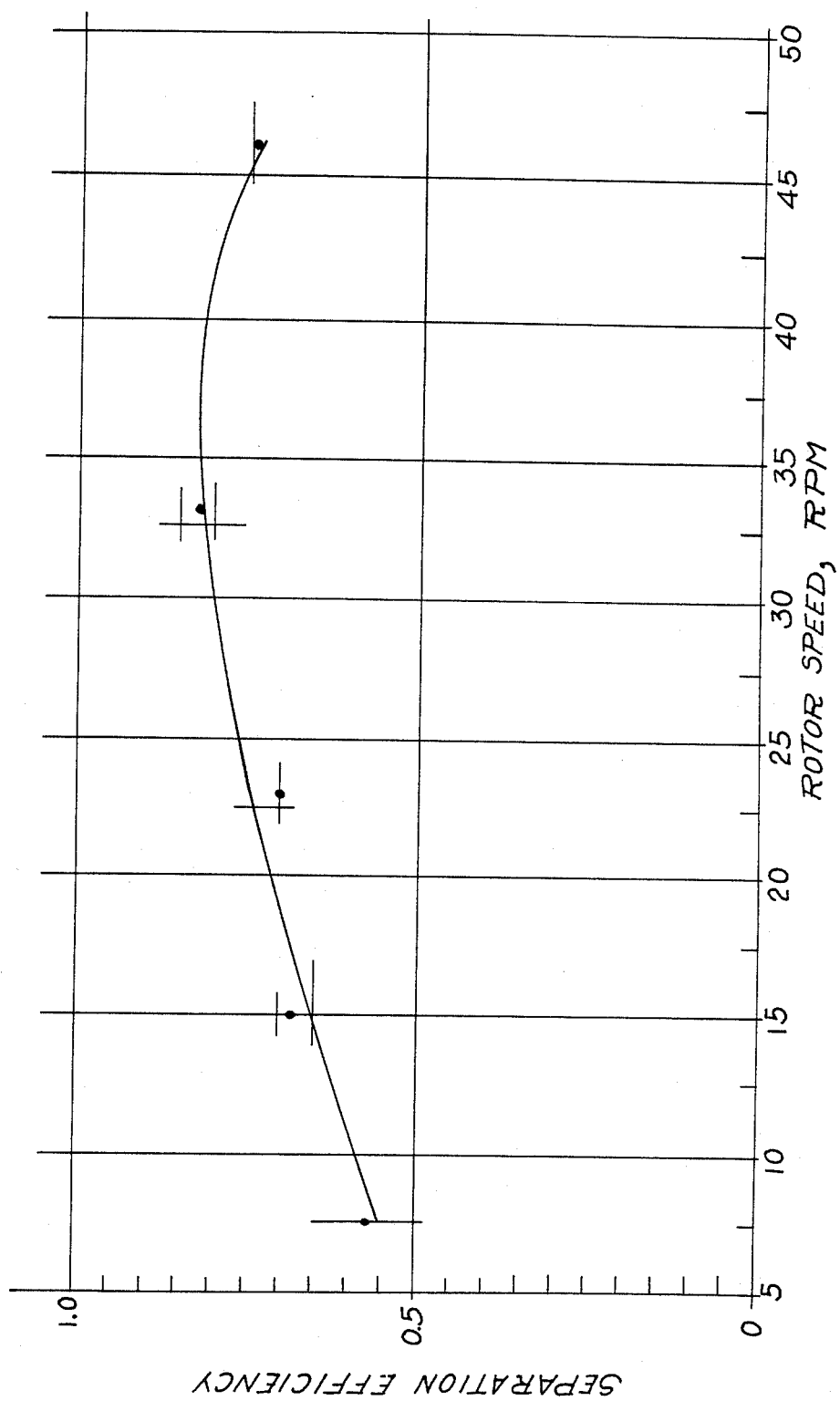

The mixture was force-fed to the passage at room temperature at approximately 22 ml/min. Several runs were made at various rotor speeds. The separated water collected from the drainage opening was observed to contain no oil. The drained water collected at steady state during each run was measured. The results are illustrated graphically in FIG. 12, in which the Separation Efficiency represents a ratio of the volume of water separated and drained to the volume of water fed to the processor at its inlet during a single pass through the one processing passage.

EXAMPLE 2

A heterogeneous mixture of about 6.72% by volume of water in a continuous phase of premelted polystyrene (Lustrex, Crystal 327 manufactured by Monsanto Co.) was force-fed at about 34 Kg/hr to a processor according to the invention. The rotor was 190.5 mm in diameter and carried a channel which was T-shaped in cross-section and was 41.3 mm in depth, 25.4 mm wide at its outer portion and having an inner portion 6.4 mm wide and 33.0 mm deep. A single flow diverter was used in the channel near the inlet to divert the flow of incoming polymer to the root of the channel.

Figure 13:
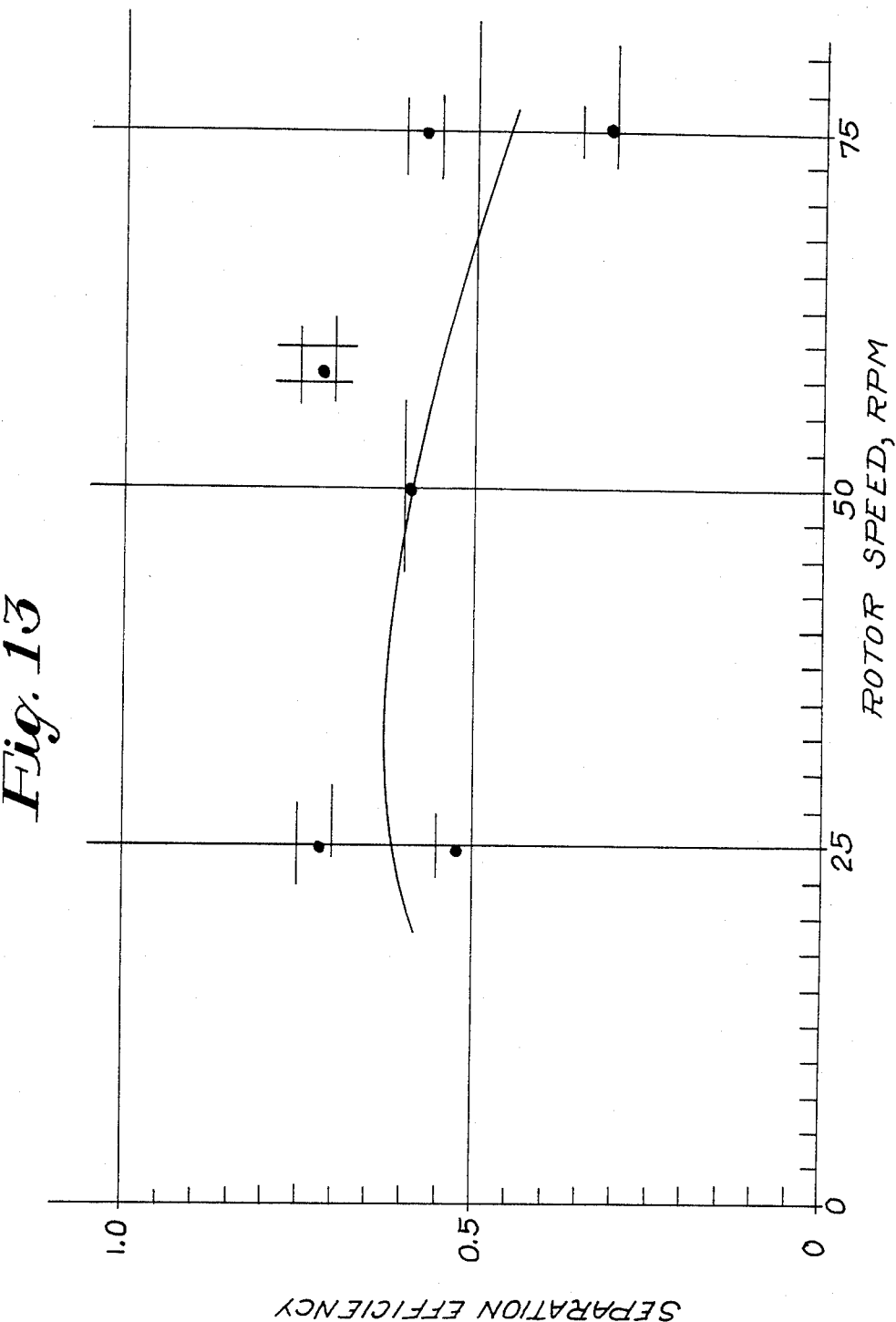

The temperature of the polymer was maintained at about 205° C. An adjustable outlet valve was used to control the pressure and size of the recirculating pool in the passage. To avoid flashing off of the water during start-up at operating temperatures, the passage was initially pressurized to the saturation pressure (about 14.6 atm), by the introduction of gaseous nitrogen through the drain hole. To reach steady state, some steam was allowed to form to gradually replace the nitrogen as a pressurizing agent. At steady state, the nitrogen was used only intermittently to clear the drainage opening. Any steam escaping through the drainage opening was condensed and collected with the drained water. Because of the size of the recirculating pool required to operate under these conditions — with the pool boundary reaching a minimum angular position of about 160° from the inlet — the drainage opening was positioned at about 75° from the inlet. Several runs were made at various rotor speeds. The results are shown graphically in FIG. 13, in which the Separation Efficiency represents a ratio of the volume of water separated and drained to the volume of water fed to the processor at its inlet during a single pass through the one processing passage. These apparent values, however, may be lower than the actual separation efficiency, since during this high pressure operation small amounts of water were continuously observed leaking from the clearance between the rotor and the housing. It may be assumed that improved sealing will increase the volume of collected water, thus increasing the calculated efficiency.

Material is introduced to the rotary processors illustrated in FIGS. 3–11 from a point outside the processors, and is discharged from the processors to a point outside the processor. However, alternate arrangements are possible. For example, the phase-separating passages illustrated in FIGS. 3–11 may be arranged as one section of a multi-section rotary processor. In that case, material may be introduced to the inlet of the first phase-separating passage through a transfer channel from a point upstream of the phase separating passage, for example from a feed section. Likewise, material may be discharged from the last phase-separating passage of the processor through a material transfer groove to a point downstream of the phase-separating passage, for example to a pumping section.

Suitable commercial uses for the methods and apparatus of the invention include separation of such mixtures as polymer/solvent systems in the manufacture of isoprene and butadiene rubbers, corn syrup/methanol systems in the manufacture of corn syrup and oil/seawater mixtures encountered during offshore drilling operations, to name only a few of the contemplated applications.

Accordingly, the invention presents to the art novel, energy efficient processors and methods for separating out at least one phase of a heterogeneous mixture of immiscible liquids of differing viscosities.

I claim:

1. Apparatus for separating out at least one phase of a material comprising a heterogeneous mixture of immiscible liquids of differing viscosities comprising:
   (a) at least one stationary surface;
   (b) at least one surface adapted for movement in a downstream direction relative to the stationary surface and forming therewith at least one enclosed processing passage in which viscous-drag-induced momentum is transferred from the moving surface(s) preferentially to the more viscous phase of the material in the passage, causing the more viscous phase to be moved downstream relative to the less viscous phase;
   (c) a drainage opening for the passage; and
   (d) an obstructing member for each passage disposed downstream of and a predetermined distance from the drainage opening and arranged to at least partially block the downstream movement of the material through the passage and to collect the material as a recirculating pool so that pressurization of the material and separation of at least some of the less viscous phase from the material can occur, the separated less viscous phase being discharged from the passage through the drainage opening.

2. Apparatus according to claim 1 further comprising:
   (e) an inlet for each passage through which the material may be introduced to the passage; and
   (f) an outlet for each passage through which the remaining material may be discharged after processing in the passage.

3. Apparatus according to claim 2 further comprising means to control the pressure at the inlet of at least one processing passage.

4. Apparatus according to claim 2 further comprising means to control the pressure at the outlet of at least one processing passage.

5. Apparatus according to claim 2 wherein:
   (g) the moving surfaces are provided by one or more annular processing channels each having opposed side walls and carried by a common rotor;
   (h) the stationary surface is provided by a substantially cylindrical inner surface of a housing coaxial with the rotor, the inner surface enclosing the one or more channels so thar the one or more processing passages so formed are annular passages, the housing having formed therein the inlet(s), the outlet(s) spaced apart from the inlet(s) at least a major portion of the circumference of the housing, and the drainage opening(s) positioned about the circumference of the housing between the inlet(s) and outlet(s); and
   (i) each obstructing member is associated with the housing and is positioned downstream of and near the outlet of the associated passage, fitting closely within the channel to provide an end wall for the passage, so that the material may be introduced to each passage through the inlet and blocked and collected at the end wall and so that at least partial separation of the less viscous phase from the material is effected within each passage by the viscous-drag-induced momentum and the pressure generated by the rotating channel side walls, the separated less viscous phase being discharged from each passage through the drainage opening and the remaining material being discharged from each passage through the outlet.

6. Apparatus according to claim 5 further comprising one or more material transfer grooves formed in the housing to interconnect the outlet of each passage except the most downstream passage and the inlet of the next adjacent downstream passage, so that material discharged from the outlet of each passage except the most downstream passage is transferred to the inlet of the next adjacent downstream passage to effect multistage separation.

7. Apparatus according to claim 6 further comprising means to mix the less viscous phase discharged from the drainage opening of each passage except the most upstream passage with the material being processed in the next adjacent upstream passage.

8. Apparatus according to claim 5 further comprising one or more flow diverters for each passage, associated with the housing and positioned between the inlet and the drainage opening and extending into the passage to divert the flow of material entering the passage away from the drainage opening.

9. Apparatus according to claim 8 wherein at least one of the diverters is adapted to provide the drainage opening.

10. Apparatus according to claim 5 wherein each processing channel has a substantially T-shaped cross-sectional configuration, providing a radially outward channel portion axially wider than the remaining, radially inward channel portion.

11. Apparatus according to claim 10 further comprising means positioned between the drainage opening and the outlet opening to at least partially block the upstream movement of the material in the recirculating pool through the radially outward portion of the passage.

12. Apparatus according to claim 1 wherein the drainage opening of at least one passage is covered by means providing a plurality of closely spaced small openings.

13. Apparatus according to claim 1 further comprising means to provide control of the temperature at one or more of the surfaces of the apparatus.

14. A method of separating out at least one phase of a material comprising a heterogeneous mixture of immiscible liquids of differing viscosities comprising the steps of:
  (a) introducing the material to a processing zone defined by at least one moveable surface, at least one stationary surface enclosing the processing zone and an obstructing member positioned between the two surfaces; and
  (b) moving the moveable surface(s) in a downstream direction relative to the stationary surface(s) and toward the obstructing member, so that viscous-drag-induced momentum is transferred from the moving surface(s) preferentially to the more viscous phase of the material in the passage causing the more viscous phase to be moved downstream relative to the less viscous phase; and
  (c) at least partially blocking the downstream movement of the material through the zone at the obstructing member and collecting the material at the obstructing member as a recirculating pool so that pressurization of the material and separation of at least some of the less viscous phase from the material can occur.

15. A method according to claim 14 further comprising the step of discharging the separated less viscous phase from the passage through a drainage opening.

16. A method according to claim 15 further comprising the step of preventing the more viscous material from entering the drainage opening.

17. A method according to claim 14 further comprising the step of controlling the temperature of the material in at least a portion of each processing zone.

18. A method according to claim 14 further comprising the step of controlling the pressure within the portion of the processing zone not occupied by the material.

19. A method according to claim 14 wherein the material is introduced to the zone at a feed point and further comprising the step of discharging the remaining material from the zone at a discharge point.

20. A method of separating out at least one phase of a material comprising a heterogeneous mixture of immiscible liquids of differing viscosities comprising the steps of:
  (a) introducing the material at a feed point to one or more substantially annular processing zones each defined by two rotatable, substantially circular walls, a coaxial stationary surface enclosing the processing zone(s) and having an opening therethrough communicating with each processing zone and arranged for drainage, and an obstructing member for each processing zone positioned downstream of and a predetermined distance from the drainage opening;
  (b) rotating the circular walls of each processing zone at substantially equal velocities, in the same direction from the feed point toward the obstructing member, so that viscous-drag-induced momentum is transferred from the rotating circular walls preferentially to the more viscous phase of the material in the zone causing the more viscous phase to be moved downstream relative to the less viscous phase;
  (c) blocking the downstream movement of the material through the zone at the obstructing member and collecting the material at the obstructing member as a recirculating pool in which pressurization of the material and separation of at least some of the less viscous phase from the material occur;
  (d) discharging the less viscous phase from each zone through the drainage opening; and
  (e) discharging the remaining material from each zone at a discharge point positioned near the obstructing member.

21. A method according to claim 20 further comprising the step of transferring the material discharged from the discharge point of each processing zone except the most downstream zone to the feed point of the next adjacent downstream processing zone.

22. A method according to claim 21 further comprising the step of mixing the less viscous phase discharged from the drainage opening of each processing zone except the most upstream zone with the material being processed in the next adjacent upstream zone.

23. A method according to claim 20 further including the step of preventing the more viscous material from entering the drainage opening.

24. A method according to claim 20 further including the step of controlling the temperature of the material in at least a portion of each processing zone.

25. A method according to claim 20 further comprising the step of controlling the pressure at which the material is introduced to at least one processing zone.

26. A method according to claim 20 further comprising the step of controlling the pressure at which the material is discharged from at least one processing zone.

27. A method according to claim 20 further including the step of controlling the pressure within the portion of the processing zone not occupied by the material.

* * * * *